UNITED STATES PATENT OFFICE.

JAKOB SEEGER, OF VIENNA, AUSTRIA-HUNGARY, ASSIGNOR OF ONE-HALF TO AUGUST BACHMEYER & CO., OF BERLIN, GERMANY.

LUBRICATING-OIL.

SPECIFICATION forming part of Letters Patent No. 339,483, dated April 6, 1886.

Application filed January 15, 1886. Serial No. 188,681. (No specimens.) Patented in Austria-Hungary November 24, 1883, XXXIII, 2,263; in England October 13, 1884, No. 13,512, and in France February 20, 1885, No. 167,184.

*To all whom it may concern:*

Be it known that I, JAKOB SEEGER, a subject of the Emperor of Austria-Hungary, and residing at Vienna, in the Empire of Austria-Hungary, have invented new and useful Improvements in Lubricating-Oils, (for which Letters Patent have been granted in Austria-Hungary November 24, 1883, Tom. XXXIII, Fol. 2,263; in Great Britain October 13, 1884, No. 13,512, and in France February 20, 1885, No. 167,184,) of which the following is a specification.

My invention consists in a new lubricating-oil composed of different substances, and which is prepared as follows: In one vessel soap made with potass (potash-soap) is dissolved in hot water to which some alcohol has been added, the mass being stirred until complete dissolution has taken place. In another vessel tallow is melted, and a small quantity of oil of turpentine and, after several minutes, a quantity of cod-liver oil, equal to about double the quantity of the former, are intimately mixed therewith. Hereupon the contents of the two vessels are poured together and the mixture thus made is stirred until its temperature has decreased to about 90° Fahrenheit, when, finally, rape-seed oil is added, while the stirring is continued or repeated at intervals until the mixture has cooled down completely. The said mixture, which is of an oily nature and of milky appearance, is then ready for use. The quantity of rape-seed oil to be added may be varied as may be considered advantageous for the special purpose for which the finished material is designed.

The lubricant thus prepared has certain properties which are not to be found with any one of the ingredients used in its composition or with any compound of a portion of them or with any existing lubricant. It does not possess or assume after a length of time any tendency to corrosive action on metals, it spreads out rapidly over the surfaces to be oiled, it presents a degree of adhesiveness by which waste is prevented, and, on account of its milky appearance, the reservoirs of the lubricators, when made of glass, may easily be controlled in respect to the degree to which they are filled.

I claim as my invention—

A lubricating-oil prepared by dissolving potash-soap in hot water to which alcohol is added, by mixing this solution with melted tallow into which oil of turpentine and cod-liver oil have been incorporated, by stirring the mass thus obtained until it has cooled down to about 90° Fahrenheit, and by finally adding rape-seed oil, substantially as hereinbefore described.

In testimony whereof I have hereunto set my hand in the presence of two subscribing witnesses.

JAKOB SEEGER.

Witnesses:
EDMUND JUSSEN,
OTTO SCHEFFER.